United States Patent [19]
Sybertz

[11] 3,931,681
[45] Jan. 13, 1976

[54] SYSTEM FOR SETTING BLADES OF A CUTTER DRUM OF A WOOD CHIPPER

[76] Inventor: Ferdinand Sybertz, Bienenweg, 6551 Hargesheim, Germany

[22] Filed: Sept. 7, 1973

[21] Appl. No.: 395,362

[30] Foreign Application Priority Data
Sept. 8, 1972  Germany............................ 2244077

[52] U.S. Cl. ............................ 33/185 R; 33/185 R
[51] Int. Cl.² ........................................ B27G 23/00
[58] Field of Search ........................... 33/185 R, 182

[56] References Cited
UNITED STATES PATENTS

| | | |
|---|---|---|
| 954,712 | 4/1910 | Blood et al......................... 33/185 R |
| 1,225,552 | 5/1917 | Wuesthoff.......................... 33/185 R |
| 1,336,311 | 4/1920 | Martin ............................... 33/185 R |
| 2,496,800 | 2/1950 | Larkins.............................. 33/185 R |

*Primary Examiner*—Richard E. Aegerter
*Assistant Examiner*—Willis Little
*Attorney, Agent, or Firm*—Karl F. Ross; Herbert Dubno

[57] ABSTRACT

The present invention relates to a method of and a device for positioning or setting the blade in the cutter drum of a wood-chipping machine or the like.

3 Claims, 6 Drawing Figures

SYSTEM FOR SETTING BLADES OF A CUTTER DRUM OF A WOOD CHIPPER

BACKGROUND OF THE INVENTION

The arbor or cutter drum of a woodcutting or chip-producing machine usually is a cylindrical body which is rotated about its longitudinal axis and which is provided on its periphery with a plurality of longitudinally extending grooves in which straight-edged blades are clamped with their edges lying on a cylindrical orbit centered on the rotation axis of the arbor. It is very important that the straight edge of each blade lie exactly parallel to the arbor's rotation axis and directly on the orbit in order to produce wood chips of uniform dimensions.

The grooves in the drum may be of a predetermined depth and the blades are of a predetermined width so that in theory they need merely be seated in these grooves so as to have their cutting edges properly positioned. In such a system, however, any deformation of the cutter drum misaligns the blades. Similarly if the blades wear and/or are reground, their width changes so that they must be reset painstakingly by hand by a skilled worker using a micrometer gauge or the like and even then any irregularities in the shape of the drum will be reflected in the setting of the blade edges.

OBJECTS OF THE INVENTION

It is therefore an object of the present invention to provide an improved method of assembling or adjusting a cutter for a wood chipper or the like so as to require relatively little downtime for the machine.

Another object is the provision of an apparatus for carrying out the method.

A further object is to provide a system whereby the blades of a cutter can be positioned or set accurately, inexpensively and rapidly.

SUMMARY OF THE INVENTION

These objects are attained according to the present invention in a system wherein the blades are first loosely or temporarily mounted on the drum with their cutting edges lying beyond the desired cylindrical blade orbit. Then the drum and a setting abutment are moved relative to each other to push the blades in until their edges lie just on this orbit, and the blades are next secured more tightly. In this manner the blades are set on a cylindrical orbit centered on the rotation axis of the drum rather than merely positioned at a fixed height above the adjacent surface of the drum.

In accordance with a feature of the invention, the abutment is a cylindrical roller which has a surface osculating the desired blade orbit. This roller may be pivotal about the rotation axis of the drum so that it is merely swung around the drum axis to push all the blades in and thereby properly position them. The roller may be pivotal about an axis parallel to the drum axis and displaceable out of a closable housing adjacent the drum into the desired position osculating the desired orbit. Then the drum is rotated to position the blades, the housing serving to protect the setting device against damage or contamination when it is not in use.

According to another feature of this invention the drum is rotated until a face of the blade lies against a first element, then a second element is brought against the edge of the blade either radially of the drum or in the plane of the blade to push it back into the desired position. These two elements may be separate and independent or they may be parts of a single body. In both cases, the ultimate position of the setting element is at a fixed distance from the drum axis corresponding to the radius of the orbit.

In accordance with yet another feature of this invention, the blades are each secured in a groove in the drum by a clamping body which at first bears with a relatively light force on the blade and, once the blade is properly positioned, bears on the blade with a considerably greater force, without displacing the blade. This clamping body may be a wedge which is forced by a centrifugal force against the blade, so that spinning the cutter at high speed after the blades are positioned serves to secure the blades tightly. Alternatively it may be spring loaded and provided with a pneumatic piston arrangement that takes up some of the spring force during the positioning operation, and thereafter allows the entire spring force to ace on the blade to hold it in place.

DESCRIPTION OF THE DRAWING

The above and other objects, features, and advantages of the invention will become more readily apparent from the following description, reference being made to the accompanying drawing in which.

SPECIFIC DESCRIPTION

Figure 1:
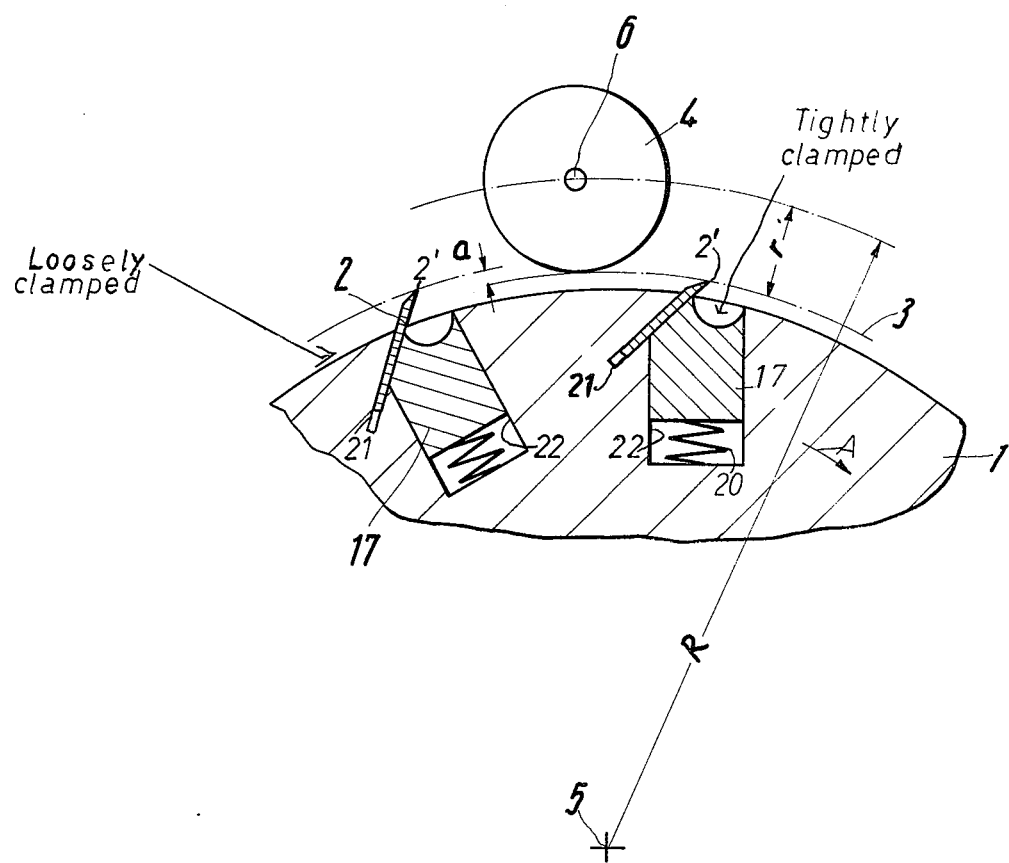
FIGS. 1–4 are diagrammatic sectional end views illustrating different embodiments of the present invention.

As shown in FIG. 1 a cutter drum 1 is formed with a plurality of radially opening and angularly spaced grooves 22 each of which receives a clamping body 17 urged radially outwardly by a spring 20. In addition each groove 22 is formed with a side groove 21 extending at an angle of approximately 45° to the radial grooves 22. A flat steel blade 2 having a straight cutting edge 2' is slidably received in each groove 21.

For the production of wood chips of uniform thickness it is necessary that the cutting edges 2' lie on a cylindrical orbit 3 centered on the axis 5 of rotation of the drum 1. In order to position these blades exactly they are first disposed to extend radially beyond this orbit 3 by, for insance, a radial distance $a$ for the blade 2 shown to the left in FIG. 1. A cylindrical setting roll 4 having an axis 6 swingable about the axis 5 (with its axis 6 spaced from the axis 5 by a distance R which may represent an arm carrying the roll 4) is brought into engagement with the projecting blade 2. This roll 4 has a radius $r$ such that its periphery lies on the cylindrical orbit 3. In this manner as the roll 4 engages the blades 2 it cams them down in the grooves 21 until their edges 2' lie just on the orbit 3. The blades 2 are inclined into the cutting direction shown at A, which is the rotation direction for the drum 1, and the drum 6 is swung about the axis 5 in the opposite direction. The springs 20 hold the blades 2 relatively loosely until after the setting operation, whereupon the drum 1 is spun at high speed to drive the wedges 17 centrifugally outwardly and lock the blades 2 tightly in place.

Figure 2:
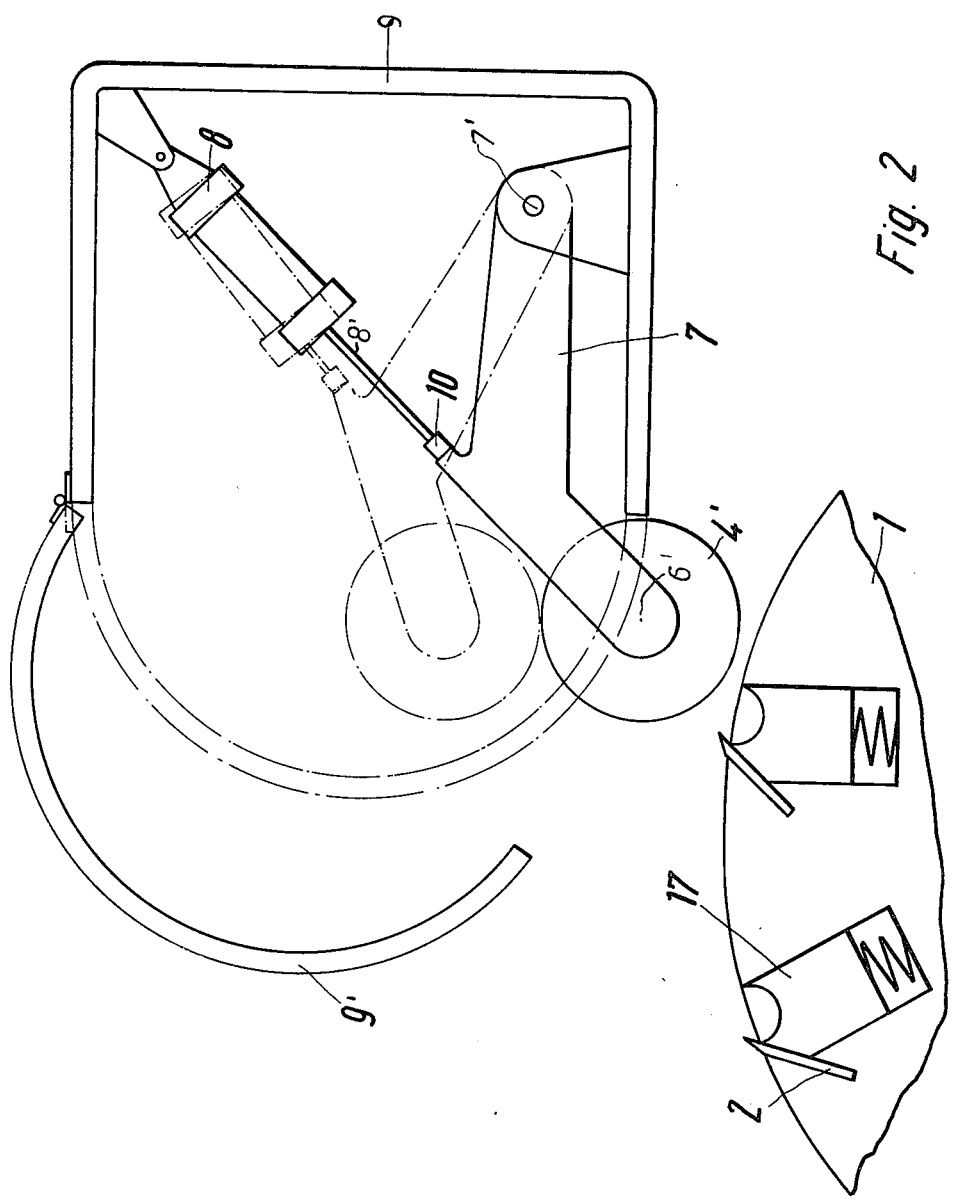

The system of FIG. 2 is essentially similar except that here the roll 4' is held stationary and the drum 1 is rotated during the setting operation. The rotation axis 6' of the drum 4' is secured on an arm 7 pivotal about a fixed axis 7' in a protective anticontamination housing 9 having a door 9'. A hydraulic ram 8 serves to displace the arm 7 like a third-class lever and has a piston rod 8' secured via an adjustment nut 10 to the arm 7. When the cylinder 8 is pressurized and fully extended the drum 4' osculates the orbit 3, the nut 10 being rotatable to ensure an exact positioning. When the blades 2 are all set the arm 7 is retracted and the door 9' is closed to protect the device.

Figure 3:
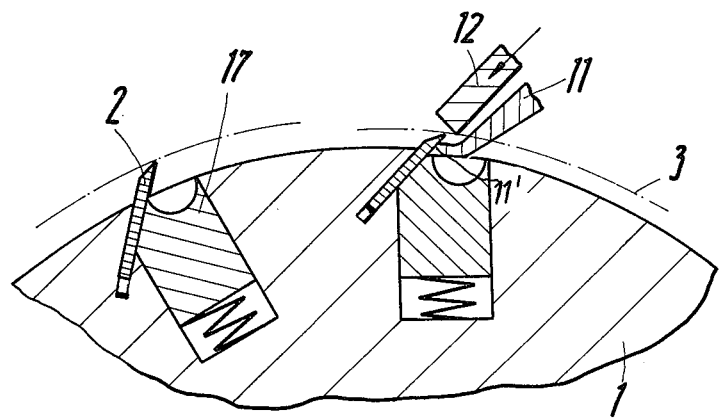

The device of FIG 3 has a first abutment or stop 11 having an end 11' projecting into the proposed orbit 3 and engageable flatly against the leading face of a blade 2 to stop the drum 1 in a predetermined position. Thereafter another element 12 is displaced inwardly along a secant of the orbit in the plane of the blade 2 resting against the end 11' to push it back into the desired position on the orbit 3. Thereafter the element 11 is drawn secantially out of the way and the abutment 12 is retracted to allow the blade to pass so that another blade can be positioned.

Figure 4:
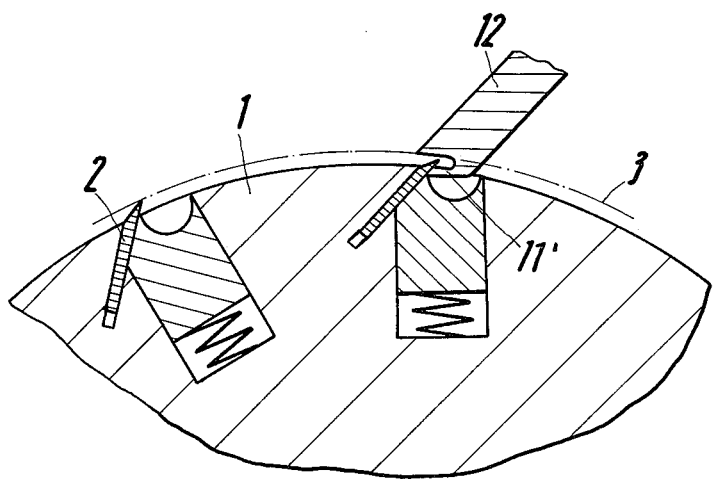

The device of FIG. 4 is identical to that of FIG. 3 except that the elements 11' and 12' here are parts of the same body which is first moved closely enough to the drum 1 for the blade 2 to engage the part 11' and then is displaced inwardly in the plane of the plade or radially.

Figure 5:
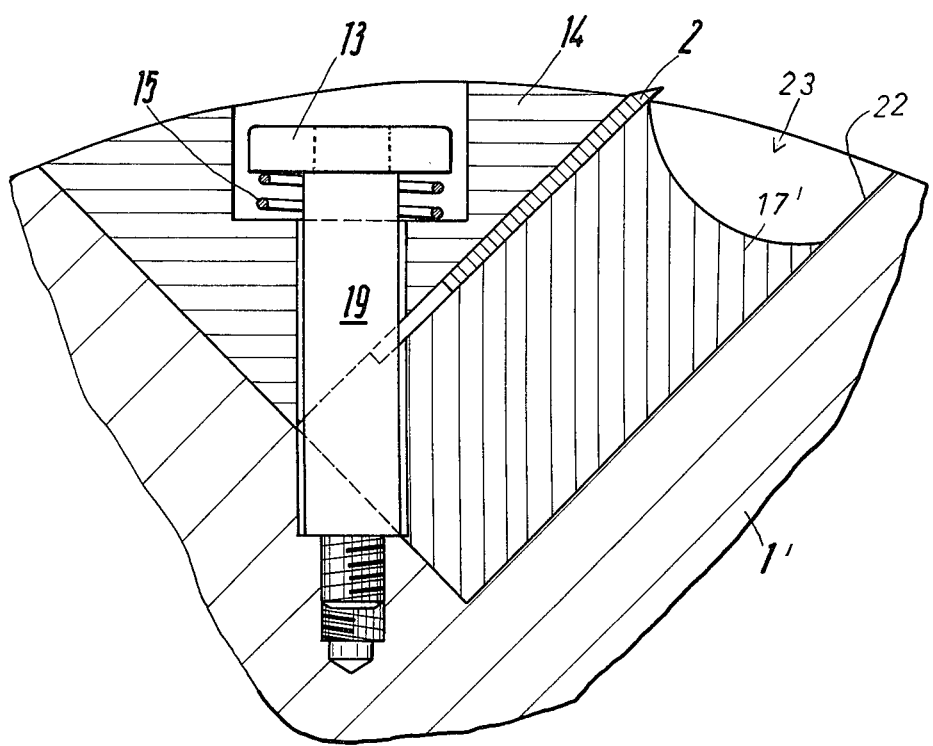
FIGS. 5 and 6 are sectional end views illustrating two different blade-clamping arrangements according to this invention.

In FIG. 5 a drum 1' is formed with a triangular-section groove 22' in which a blade 2 is secured on top of a clamping block 17' formed in front of the blade 2 with a plurality of chip-forming pockets 23. The blade 2 is clamped to the block 17' by another clamping body 14. A plurality hexagonal-head cap screws 19 screwed into the body of the drum 1' have heads 13 against which springs 15 bear, the other ends of these compression springs 15 bearing on the body 14 to urge it against the blade 2 and block 17'. The screws are not screwed completely in until the blades are properly positioned.

Figure 6:
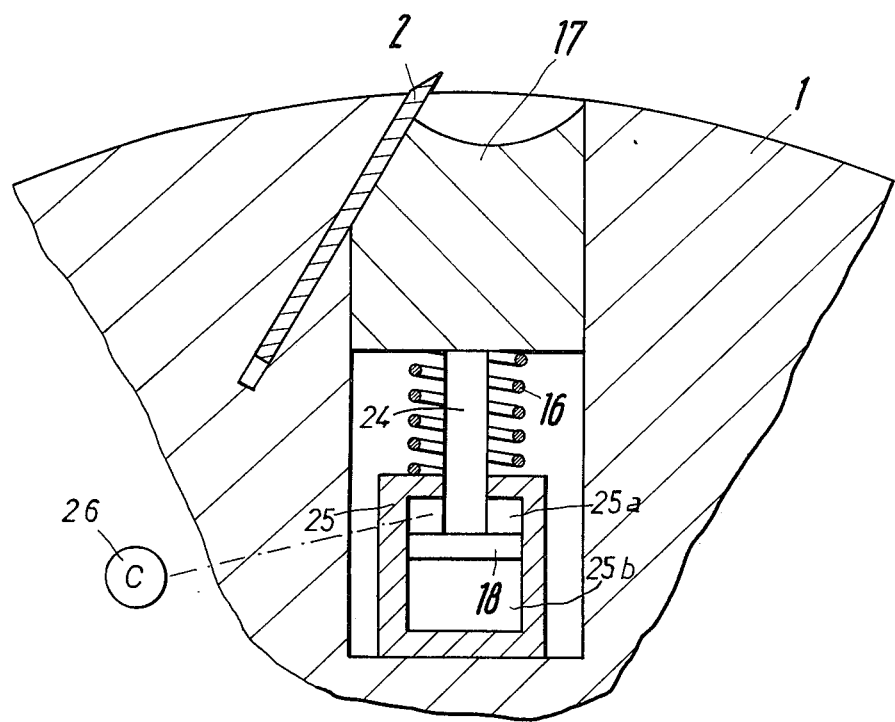

The device of FIG. 6 has a drum 1 formed with rectangular-secttion radially open grooves 22 as shown in FIG. 1. The body 17 is normally urged outwardly by a spring 16. A piston 18 carried on a rod 24 secured in the wedge 17 carries a piston 18 which defines in a cylinder 25 a pair of chambers 25a and 25b. As the blade is positioned by a roll 4 or the like the chamber 25a is pneumatically pressurized by a compressor 26 or the like to take up some of the force exerted by the spring 16 on the body 17 and blade 2. Once the blade is properly positioned, the chamber 25a is depressurized, and the prestressed spring 16 bears with full force outwardly upon the wedge body 17 to lock the blade 2 in place.

I claim:

1. An apparatus for setting a straight-edged blade on a cylindrical cutter drum rotatable abut an axis, said apparatus comprising:
    means on said drum for holding said blade on said drum and permitting displacement of said blade relative to said drum;
    means including an abutment engageable with said blade for displacing same into a position with said edge lying on a circular orbit centered on said axis; and
    means for locking said blade to said drum, said abutment including a cylindrical roll having a periphery osculating said orbit, said means engageable with said blade including means for pivoting said roll into and out of a position with said periphery osculating said orbit.
    said apparatus further comprising a housing spaced from said drum and receiving said roll in a retracted position thereof.

2. An apparatus for setting a straight-edged blade on a cylindrical cutter drum rotatable about an axis, said apparatus comprising:
    means on said drum for holding said blade on said drum and permitting displacement of said blade relative to said drum;
    means including an abutment engageable with said blade for displacing same into a position with said edge lying on a circular orbit centered on said axis; and
    means for locking said blade to said drum, said abutment having a first portion engageable with a face of said blade and a second portion engageable with the edge of said blade.

3. An apparatus for setting a straight-edged blade on a cylindrical cutter drum rotatable about an axis, said apparatus comprising:
    means on said drum for holding said blade on said drum and permitting displacement of said blade relative to said drum:
    means including an abutment engageable with said blade for displacing same into a position with said edge lying on a circular orbit centered on said axis; and
    means for locking said blade to said drum, said abutment having a first portion engageable with a face of said blade and a second portion engageable with the edge of said blade, said locking means including a spring and a wedge urged by said spring against said blade, the holding means including a fluid-pressurizable cylinder operatively connected to said wedge and mounted on said drum pressurizable to urge the wedge in the direction opposite the direction of spring bias.

* * * * *